United States Patent
Lee et al.

(10) Patent No.: US 12,414,161 B2
(45) Date of Patent: Sep. 9, 2025

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 17/578,325

(22) Filed: Jan. 18, 2022

(65) Prior Publication Data

US 2022/0232641 A1    Jul. 21, 2022

Related U.S. Application Data

(60) Provisional application No. 63/138,715, filed on Jan. 18, 2021.

(51) Int. Cl.
| | |
|---|---|
| *H04W 74/08* | (2024.01) |
| *H04W 72/04* | (2023.01) |
| *H04W 72/044* | (2023.01) |
| *H04W 72/14* | (2009.01) |
| *H04W 72/23* | (2023.01) |
| *H04W 74/0833* | (2024.01) |
| *H04W 76/20* | (2018.01) |

(52) U.S. Cl.
CPC ..... *H04W 74/0841* (2013.01); *H04W 72/044* (2013.01); *H04W 72/23* (2023.01); *H04W 74/0866* (2013.01); *H04W 76/20* (2018.02)

(58) Field of Classification Search
CPC . H04W 72/044; H04W 72/23; H04W 74/008; H04W 74/0833; H04W 74/0841; H04W 74/0866; H04W 76/20
See application file for complete search history.

(56) References Cited

U.S. PATENT DOCUMENTS

| | | | |
|---|---|---|---|
| 11,570,844 B2* | 1/2023 | Kim | H04W 36/0033 |
| 2021/0259021 A1* | 8/2021 | Huang | H04W 76/10 |
| 2021/0410180 A1* | 12/2021 | Tsai | H04W 72/1263 |
| 2022/0022266 A1* | 1/2022 | Agiwal | H04W 76/28 |
| 2022/0046749 A1* | 2/2022 | Lin | H04W 76/30 |
| 2022/0094495 A1* | 3/2022 | Wang | H04L 5/0064 |
| 2022/0210798 A1* | 6/2022 | Tsai | H04L 5/0094 |
| 2022/0232659 A1* | 7/2022 | Kim | H04W 76/27 |
| 2023/0013851 A1* | 1/2023 | Lin | H04W 74/08 |

\* cited by examiner

*Primary Examiner* — Liton Miah
(74) *Attorney, Agent, or Firm* — LEE, HONG, DEGERMAN, KANG & WAIMEY

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided.

10 Claims, 16 Drawing Sheets

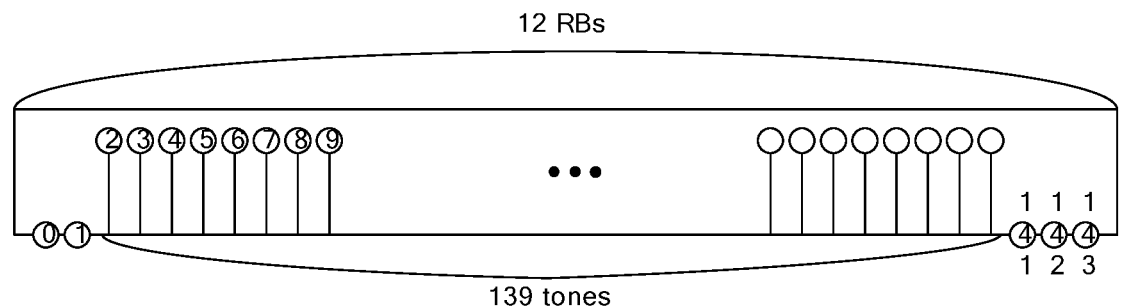

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 63/138,715, filed on Jan. 18, 2021, the contents of which is hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to an example of the present disclosure, a method of receiving a signal by a user equipment (UE) in a wireless communication system may include receiving small data transmission (SDT) configuration information including a configured grant (CG) resource configuration and a random access channel (RACH) resource configuration for SDT, the CG resource configuration being configured for the SDT, switching to a radio resource control (RRC) inactive state, triggering a RACH for the SDT based on predefined conditions being satisfied, and transmitting SDT data based on the RACH resource configuration for the SDT.

The predefined conditions may include a condition that a quality of a serving cell is greater than or equal to a set threshold.

The method may further include selecting a bandwidth part (BWP) for SDT included in the SDT configuration information, and activating the BWP based on the SDT configuration information and transmitting a RACH preamble.

The RACH resource configuration for the SDT may include a UE dedicated preamble or an SDT dedicated preamble, and the RACH preamble may be transmitted on a RACH occasion (RO) included in the RACH resource configuration for the SDT.

Based on that a result of measurement of a synchronization signal block (SSB) or channel state information reference signal (CSI-RS) mapped to the UE dedicated preamble is greater than or equal to a threshold, the RACH preamble is the UE dedicated preamble, Based on that the result of measurement of the SSB or CSI-RS mapped to the UE dedicated preamble is less than the threshold, and a result of measurement of an SSB or CSI-RS mapped to the SDT dedicated preamble is greater than or equal to the threshold, the RACH preamble may be the SDT preamble.

Based on that the result of measurement of the SSB or CSI-RS mapped to the UE dedicated preamble is less than the threshold, and the result of measurement of the SSB or CSI-RS mapped to the SDT dedicated preamble is less than the threshold, the RACH preamble may be a normal preamble.

The quality of the serving cell may be determined by a reference signal received power (RSRP) measured based on a synchronization signal block (SSB) or channel state information reference signal (CSI-RS) mapped to the RACH preamble.

The predefined conditions may include a condition that a CG for the SDT is not allocated, a condition that a time asynchronous trellis (TAT) has expired, has never been started, or is not running, and a condition that data is provided on a logical channel configured for the SDT.

The SDT configuration information may include at least one of one or more search spaces for the SDT, a RACH configuration for the SDT, a UE-specific radio network temporary identifier (RNTI) for the SDT, a maximum number of hybrid automatic repeat request (HARQ) processes for the SDT, one or more cell indices for the SDT, or one or more bandwidth parts (BWP) configurations for the SDT.

The method may further include, based on at least one of the predefined conditions being unsatisfied, transmitting the SDT data based on the CG resource configuration for the SDT.

According to an example of the present disclosure, provided herein is a non-transitory computer-readable medium having recorded thereon a program code for executing the method.

According to an example of the present disclosure, a user equipment (UE) for receiving a signal in a wireless communication system may include a transceiver and one or more processors connected to the transceiver.

The one or more processors are configured to receive small data transmission (SDT) configuration information including a configured grant (CG) resource configuration and a random access channel (RACH) resource configuration for SDT, the CG resource configuration being configured for the SDT, switch to a radio resource control (RRC) inactive state, trigger a RACH for the SDT based on predefined conditions being satisfied, and transmit SDT data based on the RACH resource configuration for the SDT.

The predefined conditions may include a condition that a quality of a serving cell is greater than or equal to a set threshold.

The one or more processors are configured to select a bandwidth part (BWP) for SDT included in the SDT configuration information, and activate the BWP based on the SDT configuration information and transmit a RACH preamble.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 8 illustrates an example of PRACH transmission in the NR system;

FIG. 9 illustrates an example of a RACH occasion defined in one RACH slot in the NR system;

DETAILED DESCRIPTION

Figure 1:
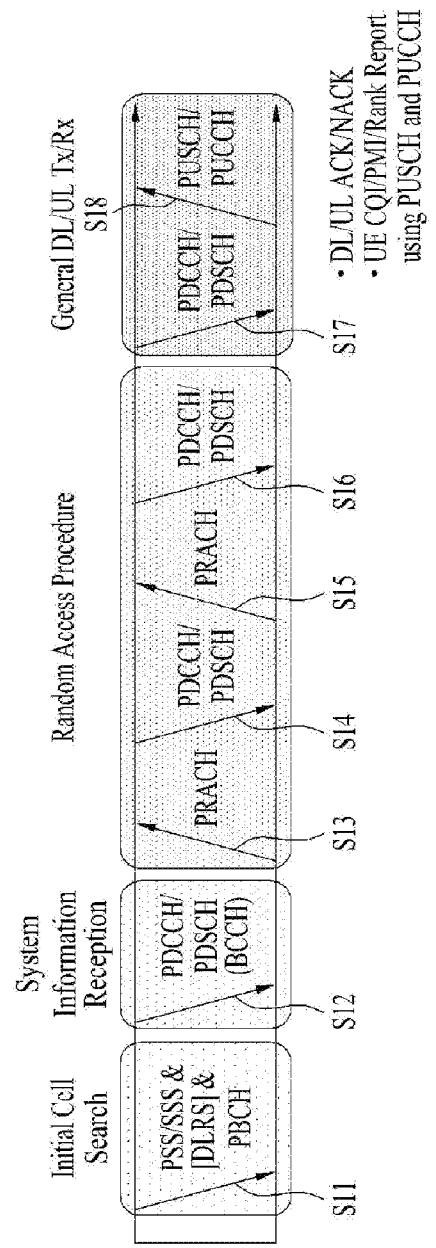
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
    TS 36.211: Physical channels and modulation
    TS 36.212: Multiplexing and channel coding
    TS 36.213: Physical layer procedures
    TS 36.300: Overall description
    TS 36.321: Medium Access Control (MAC)
    TS 36.331: Radio Resource Control (RRC)
3GPP NR
    TS 38.211: Physical channels and modulation
    TS 38.212: Multiplexing and channel coding
    TS 38.213: Physical layer procedures for control
    TS 38.214: Physical layer procedures for data
    TS 38.300: NR and NG-RAN Overall Description
    TS 38.321: Medium Access Control (MAC)
    TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
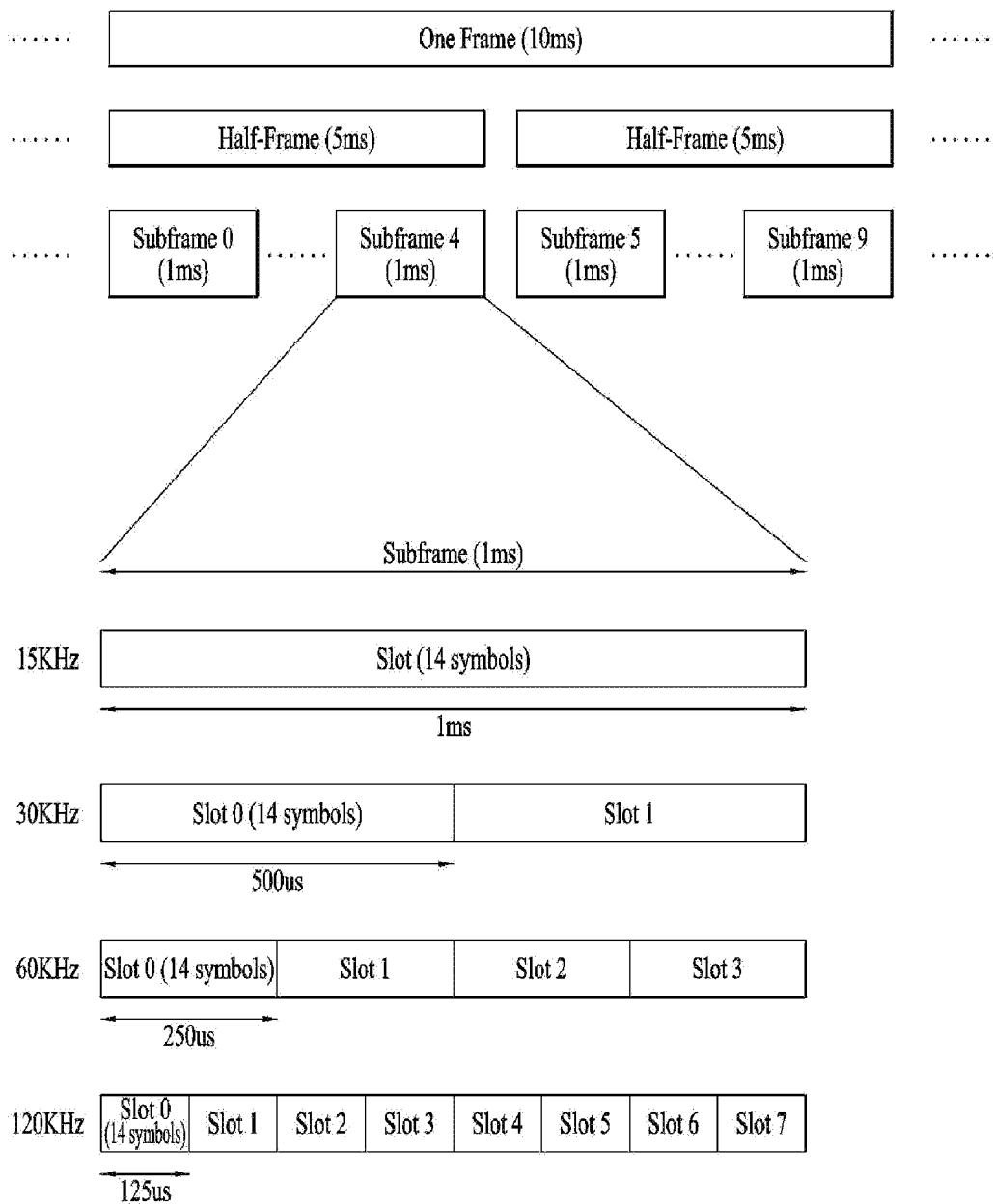
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame, u}$: Number of slots in a frame
* $N_{slot}^{subframe, u}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
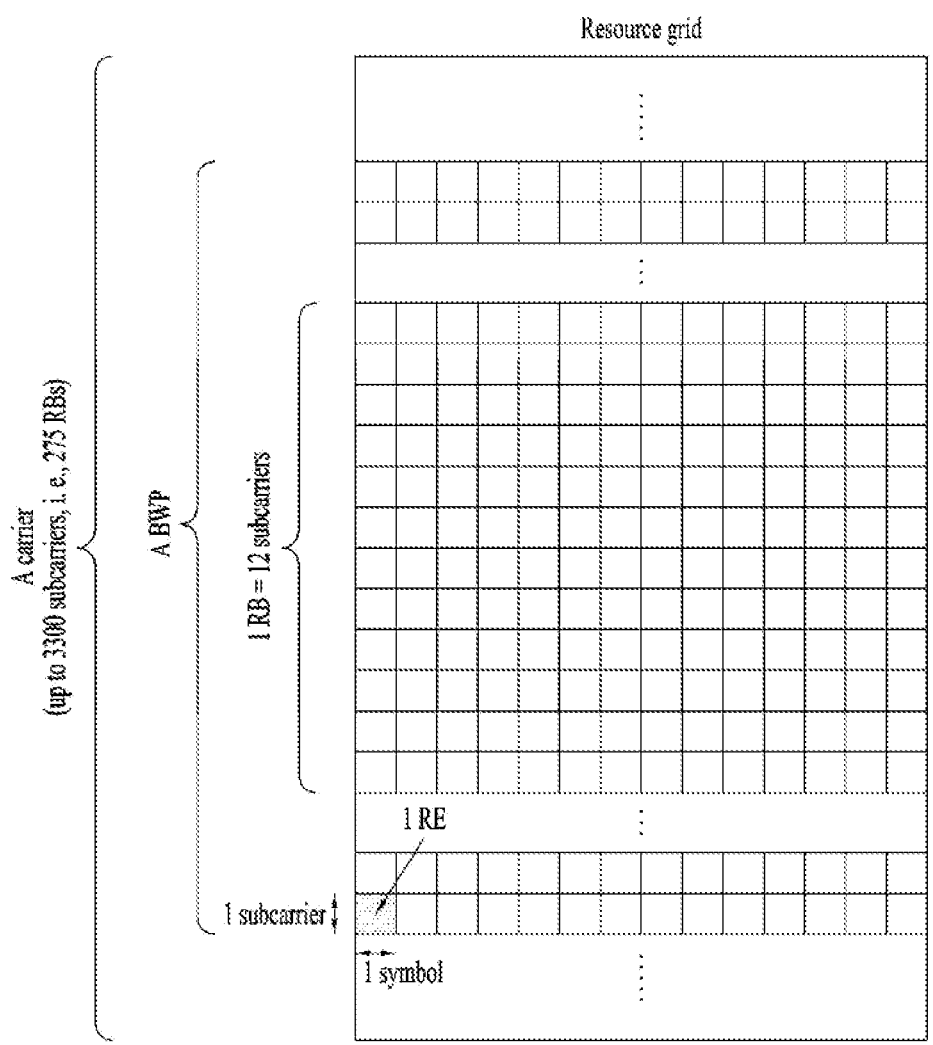
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
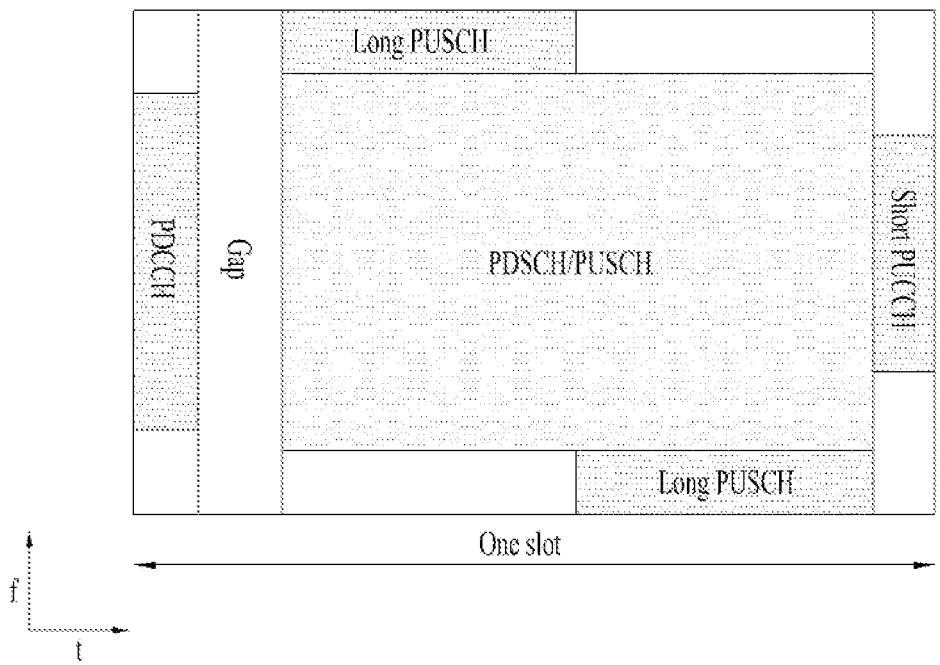
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
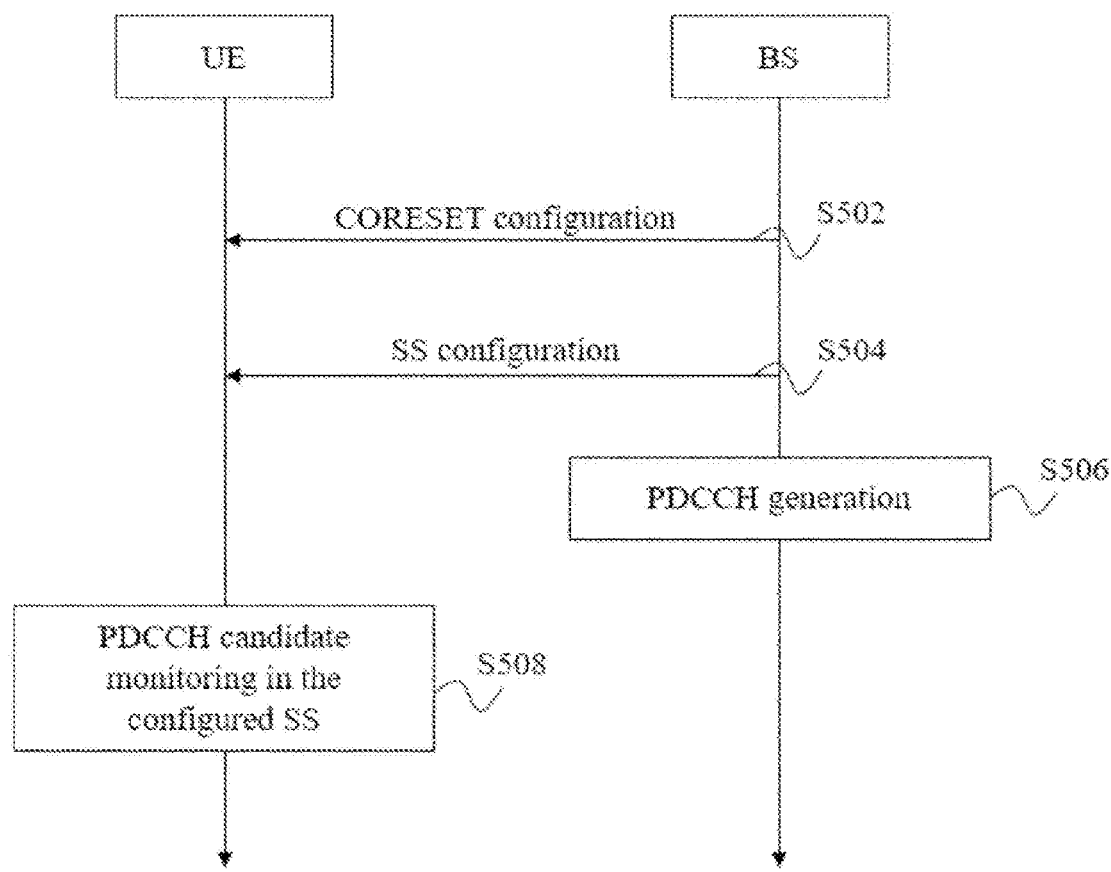
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_ CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformationBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET#0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15 or 60 corresponds to 15 kHz and the value scs30 or 120 corresponds to 30 kHz. If the UE acquires this MIB on an FR2 carrier frequency, the value scs15 or 60 corresponds to 60 kHz and the value scs30 or 120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB} > 23$ for FR1 and if $k_{SSB} > 11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB. SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
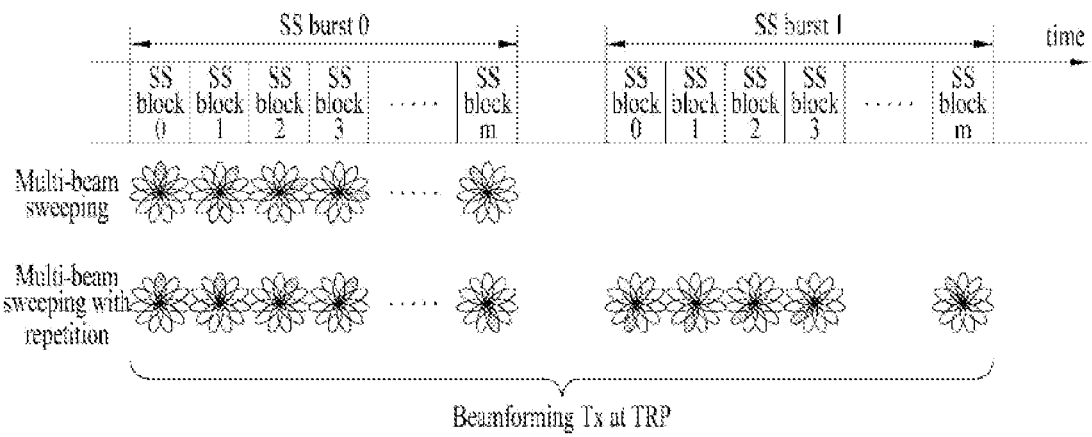
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

*Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
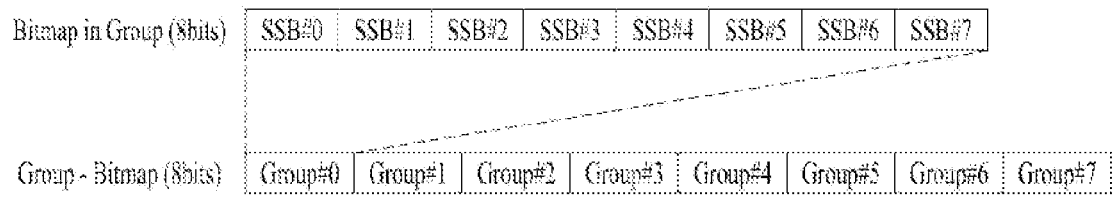
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 In NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15 \times 2^\mu$ kHz, where $\mu \in \{0,1,2,3\}$, $\kappa = T_s/T_c = 64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4,9 | 0 | 1 | 6 | 2 |
| 82 | A1 | 1 | 0 | 7,9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4,9 | 0 | 1 | 2 | 6 |
| 128 | A3 | 1 | 0 | 7,9 | 7 | 1 | 1 | 6 |
| 142 | B1 | 1 | 0 | 4,9 | 2 | 1 | 6 | 2 |
| 143 | B1 | 1 | 0 | 7,9 | 8 | 1 | 3 | 2 |
| 221 | A1/B1 | 1 | 0 | 4,9 | 2 | 1 | 6 | 2 |
| 222 | A1/B1 | 1 | 0 | 7,9 | 8 | 1 | 3 | 2 |
| 235 | A2/B2 | 1 | 0 | 4,9 | 0 | 1 | 3 | 4 |
| 236 | A2/B2 | 1 | 0 | 7,9 | 6 | 1 | 2 | 4 |
| 251 | A3/B3 | 1 | 0 | 4,9 | 0 | 1 | 2 | 6 |
| 252 | A3/B3 | 1 | 0 | 7,9 | 2 | 1 | 2 | 6 |

Referring to Table 6, information about the number of ROs defined in a RACH slot for each preamble format (i.e., $N_t^{RA, slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

FIG. 10 illustrates an example of a RACH procedure;

The random access procedure of the UE may be summarized as shown in Table 7 and FIG. 10.

the UE, that is, Msg1, is in the RAR. Presence/absence of RA information related to Msg1 transmitted by the UE may be determined based on whether there is an RA preamble ID for the preamble transmitted by the UE. When there is no response to Msg1, the UE may retransmit the RACH pre-

TABLE 7

| Type of Signals | Operations/Information obtained |
|---|---|
| $1^{st}$ step    PRACH preamble in UL | * Initial beam obtainment |
| | * Random selection of RA-preamble ID |
| $2^{nd}$ step    Random Access Response on DL-SCH | * Timing Advanced information |
| | * RA-preamble ID |
| | * Initial UL grant, Temporary C-RNTI |
| $3^{rd}$ step    UL transmission on UL-SCH | * RRC connection request |
| | * UE identifier |
| $4^{th}$ step    Contention Resolution on DL | * Temporary C-RNTI on PDCCH for initial access |
| | * C-RNTI on PDCCH for UE in RRC_CONNECTED |

The random access procedure is used for various purposes. For example, the random access procedure may be used for initial network access, handover, and UE-triggered UL data transmission. The UE may acquire UL synchronization and UL transmission resources through the random access procedure. The random access procedure is divided into a contention-based random access procedure and a contention free random access procedure.

Figure 10A:
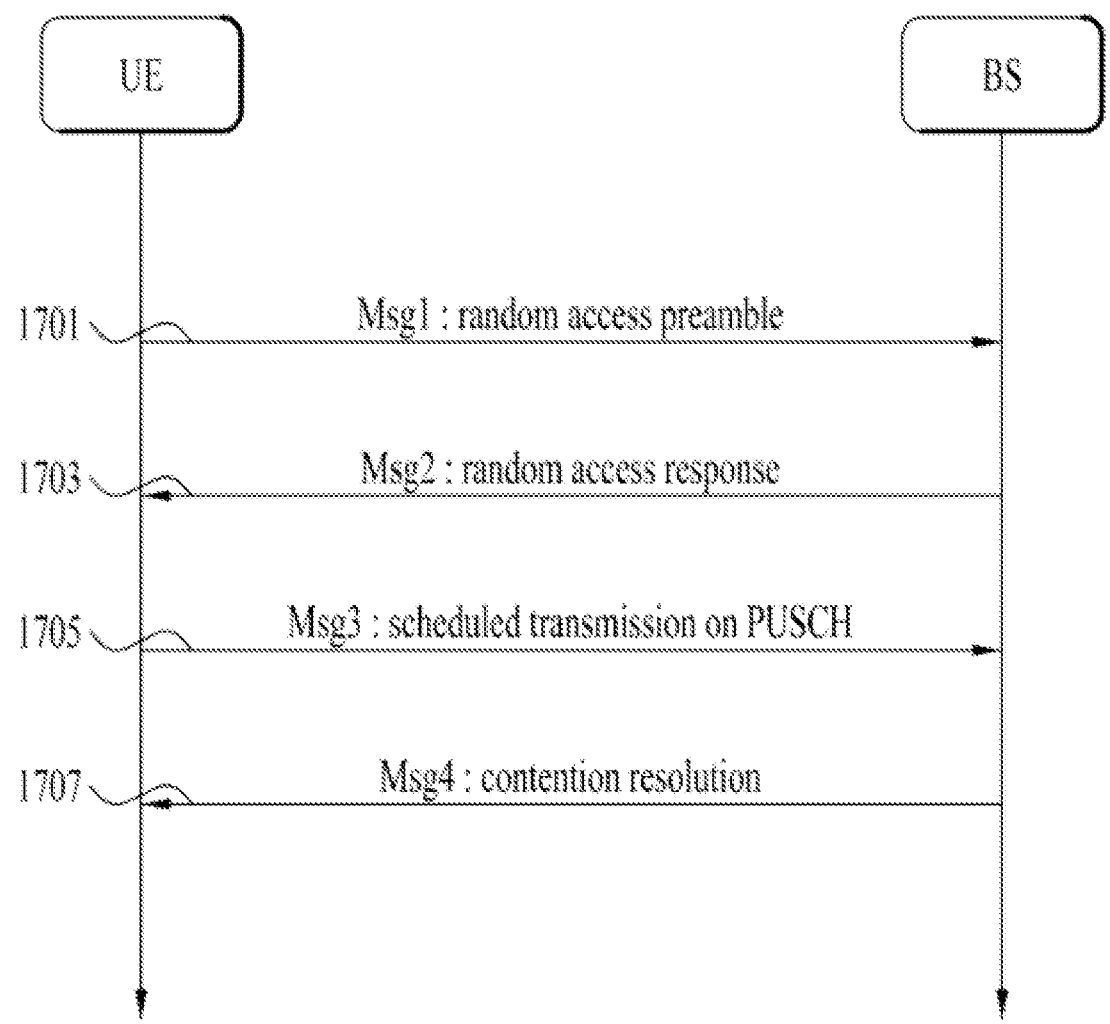
FIG. 10 illustrates an example of a RACH procedure.
Figure 10B:
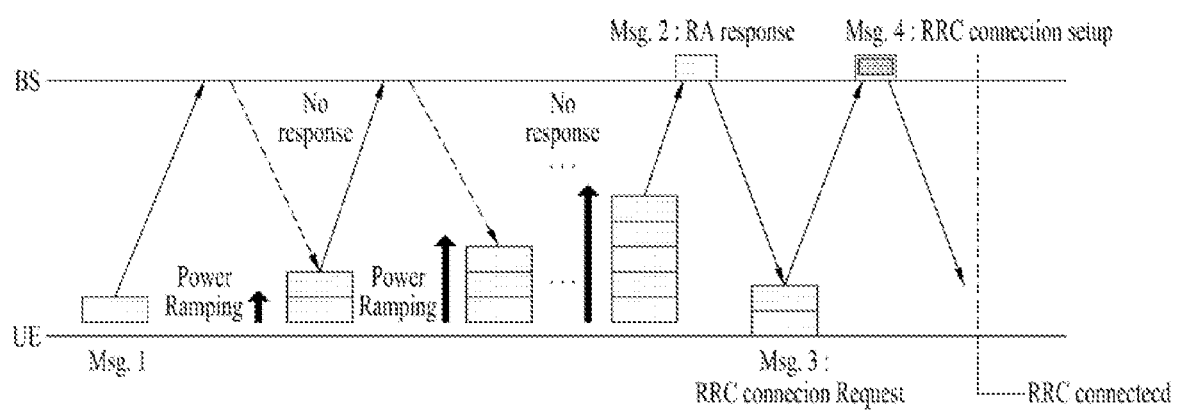

FIGS. 10A and 10B illustrate an example of the random access procedure, in particular, the contention-based random access procedure.

First, the UE may transmit a random access preamble on the PRACH as Msg1 of the random access procedure on UL (e.g., refer to 1701 in FIG. 10A).

Random access preamble sequences having two different lengths are supported: a long sequence length of 839, which is applied for subcarrier spacing of 1.25 kHz and 5 kHz; a short sequence length of 139, which is applied for subcarrier spacing of 15 kHz, 30 kHz, 60 kHz and 120 kHz.

Multiple preamble formats are defined by one or more RACH OFDM symbols and different cyclic prefixes (and/or guard times). RACH configuration for a cell is included in the system information about a cell and provided to the UE. The RACH configuration includes information about the subcarrier spacing of the PRACH, available preambles, and preamble formats. The RACH configuration includes information about association between SSBs and RACH (time-frequency) resources. The UE transmits a random access preamble on the RACH time-frequency resource associated with a detected or selected SSB.

A threshold of SSBs for RACH resource association may be set by the network, and transmission and retransmission of the RACH preamble are performed based on an SSB in which reference signal received power (RSRP) measured based on the SSB satisfies the threshold. For example, the UE may select one of SSB(s) satisfying the threshold, and transmit or retransmit the RACH preamble based on the RACH resource associated with the selected SSB.

When the BS receives a random access preamble from the UE, the BS transmits a random access response (RAR) message (Msg2) to the UE (refer to, for example, 1703 in FIG. 10A). A PDCCH for scheduling a PDSCH carrying the RAR is CRC-masked with a random access (RA) radio network temporary identifier (RNTI) (RA-RNTI) and transmitted. Upon detecting the PDCCH masked with the RA-RNTI, the UE may receive the RAR from the PDSCH scheduled by DCI carried by the PDCCH. The UE checks whether RAR information for the preamble transmitted by amble a predetermined number of times or fewer times while performing power ramping. The UE calculates the PRACH transmission power for retransmission of the preamble based on the most recent path loss and power ramping counter.

When the UE receives the RAR information intended therefor on the PDSCH, the UE may recognize timing advance information for UL synchronization, an initial UL grant, and a UE temporary cell RNTI (C-RNTI). The timing advance information is used to control the UL signal transmission timing. In order to better align the PUSCH/PUCCH transmission by the UE with the subframe timing at the network side, the network (e.g., the BS) may measure the timing difference between PUSCH/PUCCH/SRS reception and subframes, and send timing advance information based on the measured difference. The UE may perform UL transmission by Msg3 for the RA procedure on an uplink shared channel based on the RAR information. Msg3 may include an RRC connection request and a UE identifier. In response to Msg3, the network may transmit Msg4, which may be treated as a contention resolution message on DL (refer to, for example, 1707 in FIG. 10A). Upon receiving Msg4, the UE may enter the RRC connected mode.

The contention-free RA procedure may be used when the UE performs handover to another cell or BS, or the procedure is requested according to a command from the BS. Basically, the contention-free RA procedure is similar to the contention-based RA procedure. However, in the contention-free RA procedure, a preamble to be used by the UE (hereinafter, a dedicated RA preamble) is assigned to the UE by the BS, unlike in the contention-based RA procedure, in which the UE randomly selects a preamble to use among a plurality of RA preambles. Information on the dedicated RA preamble may be included in an RRC message (e.g., a handover command) or may be provided to the UE through a PDCCH order. Once the RA procedure is initiated, the UE transmits the dedicated RA preamble to the BS. When the UE receives the RA procedure from the BS, the RA procedure is completed.

As mentioned above, the UL grant in the RAR schedules PUSCH transmission for the UE. The PUSCH carrying the initial UL transmission by the UL grant in the RAR is also referred to as Msg3 PUSCH. The content of the RAR UL grant starts at the MSB and ends at the LSB, and is given in Table 8.

TABLE 8

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine the transmit power of the Msg3 PUSCH, and is interpreted according to, for example, Table 9.

TABLE 9

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free RA procedure, the CSI request field in the RAR UL grant indicates whether the UE will include aperiodic CSI report in the PUSCH transmission. The subcarrier spacing for Msg3 PUSCH transmission is provided by an RRC parameter. The UE will transmit the PRACH and Msg3 PUSCH on the same UL carrier of the same serving cell. The UL BWP for Msg3 PUSCH transmission is indicated by SystemInformationBlock1 (SIB1).

Figure 11A:
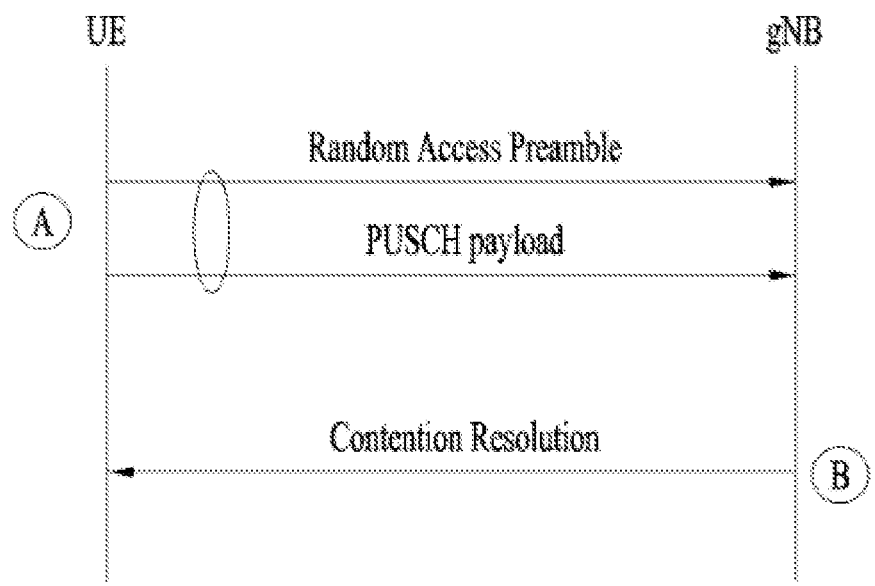
FIG. 11 illustrates an example of a 2-step RACH procedure.
Figure 11B:
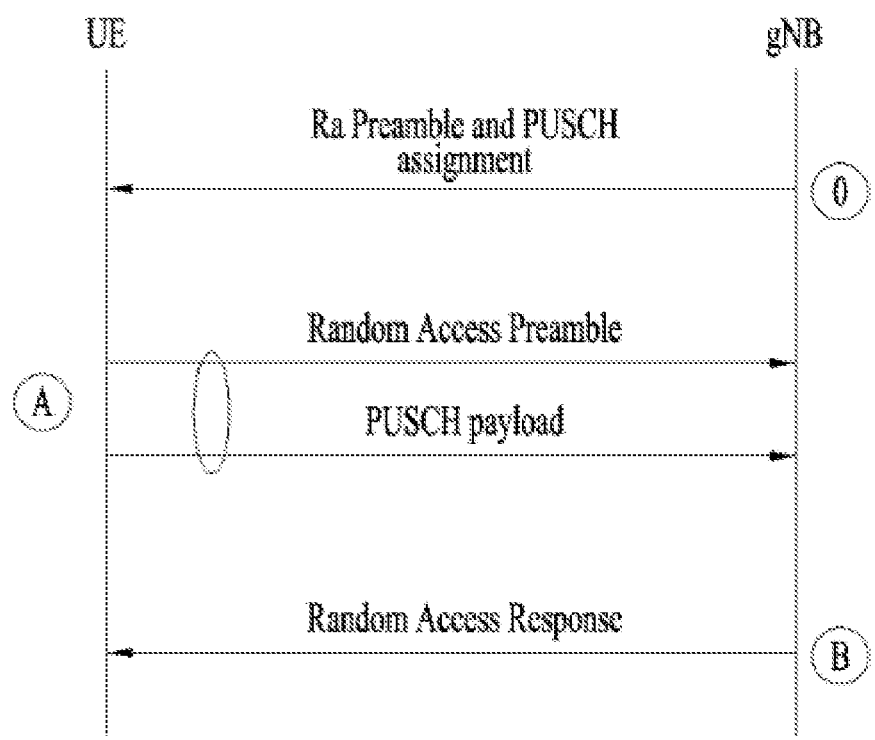

FIG. 11 illustrates an example of a 2-step RACH procedure. Specifically, in FIG. 11, FIG. 11A illustrates contention-based random access (CBRA), and FIG. 11B illustrates contention-free random access (CFRA).

In FIG. 11, message A (MSGA) includes a preamble and a payload (PUSCH payload). The preamble and the payload are multiplexed in a manner of TDM. Message B (MSGB), which is a response to MSGA, may be transmitted for contention resolution, fallback indication(s) and/or backoff indication NR supports the RRC_INACTIVE state in addition to the RRC_IDLE state. Generally, a terminal transmitting infrequent (periodic and/or non-periodic) data may be instructed by the BS to stay in the RRC_INACTIVE state. Since data transmission in the RRC_INACTIVE state is not supported in versions up to Rel-16, the UE must resume RRC connection, that is, transition to the RRC_CONNECTED state, in order to transmit UL (mobile originated) and/or DL (mobile terminated) data. The connection setup for data transmission and the subsequent operation of returning to the RRC_INACTIVE state are required regardless of the size of the data to be transmitted, and therefore they cause unnecessary power consumption and signaling overhead. This issue becomes particularly serious when the size of the data to be transmitted is small and the transmission is infrequent as follows.

Smartphone Applications:
  Traffic from Instant Messaging (IM) services
  Heart-beat/keep-alive traffic from IM/e-mail clients and other apps
  Push notifications from various applications Non-Smartphone Applications:
  Traffic from wearables (periodic positioning information, etc.)
  Sensors (Industrial Wireless Sensor Networks transmitting temperature, pressure readings periodically or in an event triggered manner, etc.)
  Smart meters and smart meter networks sending periodic meter readings The UE may transmit small data transmission (SDT) UL data on 2-step or 4-step RACH. However, since the inactive UE may trigger the RACH for SI request or RRC resume, the BS cannot determine whether the UE executing the RACH intends to transmit SDT UL data. In addition, the UE cannot determine whether the BS allocates PUSCH resources for SDT UL data.

RA-SDT

Figure 12:
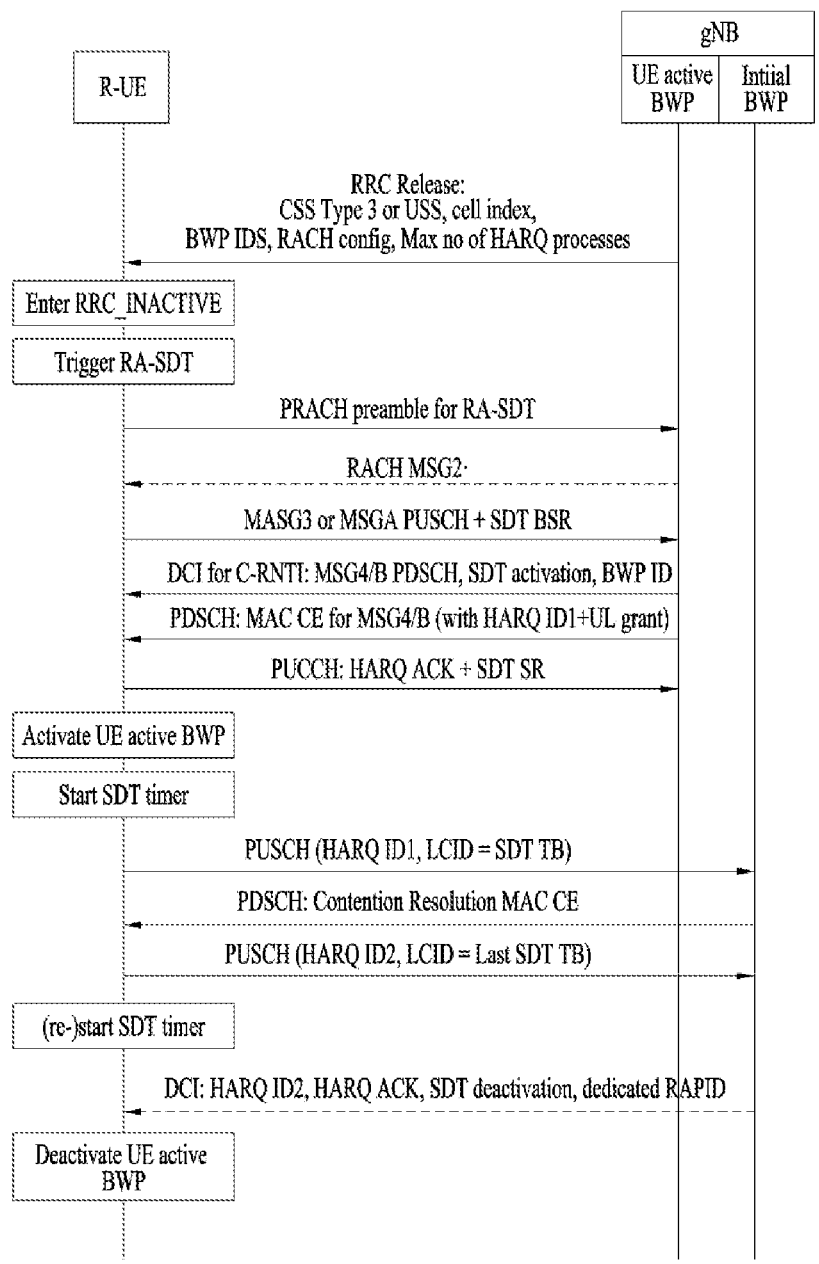
FIG. 12 illustrates an example of a RACH and SDT transmission process according to the present disclosure.

In order to address the aforementioned issues, an NR UE may start SDT after RACH in the RRC_INACTIVE state, as shown in FIG. 12.

FIG. 12 illustrates an example of a RACH and SDT transmission process according to the present disclosure.

Referring to FIG. 12, a BS (gNB) and a UE configure SDT and transmit UL data through the SDT as follows.

1. An RRC_CONNECTED UE receives an RRC Release message indicating suspension and switches to RRC_INACTIVE. In this case, a UE dedicated message may include one or more pieces of SDT configuration information as described below. The UE dedicated message is the RRC Reconfiguration message received by the UE before the RRC Release message, or the RRC Release message.

A. One or More SDT Search Spaces
  i. The BS may provide one or more search space configurations for SDT. For example, CSS Type 3 that may be used in the inactive state or one or more USSs may be allocated. When there is no SDT search space configuration received by the UE through the UE dedicated message, the UE receives and stores a CSS type SDT search space configuration from the system information of the serving cell in the RRC_INACTIVE state.
  ii. When the UE performs SDT RACH in the inactive state, the BS may reconfigure the SDT search space configuration dedicated to the UE.
  iii. After the RACH is successfully terminated, the UE configures CSS Type 3 or one or more USSs according to the stored configuration information. The UE releases the CSS Type 3 or one or more USSs after SDT transmission/reception is terminated.

B. RACH Configuration for SDT
  i. The BS may provide a separate UE dedicated SDT RACH configuration through the UE dedicated message or the system information. When the UE performs SDT RACH in the inactive state, the BS may reconfigure the UE dedicated SDT RACH configuration.
  ii. When the UE triggers the RACH for SDT, the UE performs RACH transmission/reception based on the SDT RACH configuration. On the other hand, when the RACH is triggered for an SI request or RRC connection establishment rather than the SDT, the UE performs RACH transmission/reception based on the RACH configuration received through SIB1.
  iii. On the other hand, when the BS does not provide a separate SDT RACH configuration through the UE dedicated message, the UE may perform the SDT through the RACH configuration received through the system information. In the case where the system information provides a separate SDT RACH configuration, when the RACH is triggered for the SDT, the UE may perform RACH transmission/reception based on the SDT RACH configuration.

iv. The BS may configure the SDT RACH configuration such that the configuration may be used for the SI request or RRC connection establishment. When such a configuration is provided, the UE performs RACH through the SDT RACH configuration even for the SI request or RRC connection establishment according to the instruction of the BS.

v. When the SDT RACH configuration is transmitted through the UE dedicated message, a UE dedicated preamble for SDT or an SDT dedicated preamble may be included in the SDT RACH configuration. Here, the SDT dedicated preamble may be a preamble shared by UEs which use the SDT RACH, and the BS may recognize from the preamble that the UE performs the SDT. In this case, the UE may perform contention-free RACH using the UE dedicated preamble on the RO included in the SDT RACH configuration. In addition, it may perform contention based RACH using the SDT dedicated preamble on the RO included in the SDT RACH configuration. In the case where the RACH is performed on an RO that is not included in the SDT RACH configuration, the UE may not perform contention-free RACH using the UE/SDT dedicated preamble, and must execute contention based RACH after random preamble selection.

vi. The SDT RACH configuration indicates whether the SDT RACH is a 2-step RACH or 4-step RACH, or whether both the 2-step RACH and the 4-step RACH are possible, and specifies the positions of a RACH slot and an RO for the SDT, a RACH preamble ID, and the like. In addition, when the MSG3 PUSCH or the MSGA PUSCH is repeatedly transmitted, the number of repeated transmissions, the repeated transmission period, and the like may be set. In the case where some essential parameters for the SDT RACH are not included in the SDT RACH configuration received by the UE, the UE receives the remaining essential parameter settings from the system information after applying the SDT RACH configuration. That is, when there is an essential parameter that has not been received through the UE dedicated message, the UE receives the value of the essential parameter through the system information of the cell index and applies the same to the SDT RACH.

C. UE Specific RNTI for SDT i. The BS instructs the UE to continue to use the C-RNTI used in RRC_CONNECTED in RRC_INACTIVE, or allocates a new UE specific RNTI (e.g., a C-RNTI having a different value). When the UE performs SDT RACH in the inactive state, the BS may reconfigure the UE specific RNTI.

ii. When the BS instructs the UE to use the C-RNTI in the inactive state, the UE applies the C-RNTI to the SDT. In this operation, the UE applies the C-RNTI only to the cell index indicated by the BS. If the UE leaves the cell of the cell index and reselects another cell in the inactive state, the UE discards the corresponding C-RNTI.

D. Maximum Number of HARQ Processes for SDT i. The BS may set the maximum number of HARQ processes for SDT through a UE dedicated message or system information. For the SDT UL transmission of the UE, the BS supports UL transmission using one or more HARQ processes as many as the maximum number.

ii. Alternatively, the UE may report the maximum number of HARQ processes to the BS as capability, and the BS operates as many HARQ processes for SDT as the reported number.

E. Cell Index for SDT i. The BS may provide a separate SDT BWP ID through a UE dedicated message or system information.

ii. The UE applies the SDT configuration information only to the cell indicated by the cell index, and performs the SDT only in the indicated cell.

F. UL/DL BWP Configuration for SDT i. The BS may provide one or more separate SDT BWP IDs through a UE dedicated message or system information. It may also provide detailed configurations such as PRB and SCS for each SDT BWP. When the UE performs SDT RACH in the cell of the cell index in the inactive state, the BS may reconfigure one or more SDT BWP IDs for the cell index.

ii. The SDT BWP ID is applied to the cell index. Accordingly, the UE applies the SDT configuration information to the SDT BWP ID of the indicated cell index. That is, it performs the SDT only in the UL/DL BWP indicated by the BWP ID.

iii. In the case where a separate SDT BWP ID is not configured through the UE dedicated message, the UE may receive system information in the inactive state and configure an SDT BWP ID. In this case, when the system information indicates that the cell of the cell index supports the SDT, and a separate SDT BWP ID is not configured through the system information, the UE performs the SDT through the initial BWP.

2. Upon receiving the RRC Release, the UE enters the RRC_INACTIVE mode and performs cell selection or cell reselection. Then, the UE preferentially selects a cell for which the SDT configuration information of the RRC Release is supported. For example, the priority of the frequency of the cell indicated by the cell index may be set to be the highest, and an offset may be added to the quality of the cell indicated by the cell index such that the cell may be preferentially selected. In this case, the value of the offset may be set by the BS through a UE dedicated message such as the RRC Release.

A. In the case where the cell of the cell index for which the SDT configuration information of the RRC Release is supported is selected, when the quality of the cell is greater than or equal to a threshold, a time alignment timer (TAT) for SDT is (re)started. On the other hand, in the case where a cell for which the SDT configuration information is not supported (e.g., a cell not indicated by the cell index) is selected, or the quality of the cell of the cell index is below the threshold, the TAT for the SDT is stopped or (re)started.

3. The inactive UE triggers RACH for SDT when one or more of the following conditions are satisfied:

A. A configured grant (CG) for SDT is not assigned;

B. The TAT has expired, has never been started, or is not running;

C. Data is generated on a logical channel configured for SDT;

D. When the quality of the serving cell or the quality of the best SSB of the serving cell is greater than or equal to the threshold indicated by the BS.

When the RACH is triggered, the UE selects one SDT BWP included in the SDT configuration information and transmits a RACH preamble by activating a corresponding UL BWP.

When a UE dedicated preamble for SDT is included in the SDT RACH configuration, and a measurement result of the SSB or CSI-RS to which the preamble is mapped is greater than or equal to the threshold, the UE transmits the UE dedicated preamble on the RO included in the SDT RACH configuration to start the contention-free RACH.

However, when the measurement result of the SSB or CSI-RS to which the UE dedicated preamble is mapped is below the threshold and the SDT dedicated preamble is included in the SDT RACH configuration, the UE may perform a contention based RACH on the RO included in the SDT RACH configuration using the SDT dedicated preamble. In this case, when the measurement result of the SSB or CSI-RS to which the SDT dedicated preamble is mapped is greater than or equal to the threshold, the UE selects the SDT dedicated preamble and transmits the RACH preamble.

If the measurement result of the SSB or CSI-RS to which the SDT dedicated preamble is mapped does not exceed the threshold, or there is no SDT dedicated preamble in the SDT RACH configuration, the UE selects a normal preamble and performs RACH. When performing PRACH transmission with the normal preamble, the UE triggers RRC connection establishment as in the conventional cases and transmits the RACH preamble for RRC connection establishment.

Alternatively, when transmitting the PRACH with the normal preamble, the UE may perform SDT RACH according to the indication from the BS. In this case, SDT may be indicated through MSG2 or MSG4.

4. In case of the 4-step RACH, the UE monitors DCI in which CRC is scrambled with RA-RNTI after transmitting the RACH preamble. Here, the RA-RNTI of the RACH for SDT may be determined to be a value different from that of the conventional RA-RNTI. Alternatively, DCI may be monitored with an RNTI of a new value and name. The UE receives an MSG2 PDSCH through the received DCI. In this case, the MAC PDU of the MSG2 PDSCH includes, in the sub-header, the RAPID for the RACH preamble transmitted by the UE. It also includes an RAR MAC CE mapped to the sub-header. The RAR MAC CE may allocate an MSG3 PUSCH UL grant for SDT UL data transmission, a temporary C-RNTI, and a PUCCH resource. Alternatively, MSG3 UCI transmission may be indicated. In case of the 4-step RACH, the UE transmits a first TB (i.e., MAC PDU) on the MSG3 PUSCH. When the MSG2 DCI or MSG2 RAR MAC CE indicates SDT BWP ID, the UE activates the indicated SDT BWP and transmits MSG3 in the activated SDT BWP. At this time, the initial BWP is deactivated. However, when there is no indicated SDT BWP, the UE transmits MSG3 in the initial BWP.

In the case of the 2-step RACH, the first TB is transmitted on the MSGA PUSCH. When the SDT BWP ID is included in the SDT configuration information, the UE activates the indicated SDT BWP and transmits the MSGA in the SDT BWP. At this time, the initial BWP is deactivated. However, when there is no indicated SDT BWP, MSGA is transmitted in initial BWP.

In this case, the first TB may include a SDT buffer status report (BSR) MAC CE and a common control channel (CCCH) message including a UE ID. The UE ID is the C-RNTI used by the UE in the RRC_CONNECTED mode or the C-RNTI received by the UE through the RRC Release message. The LCID field in the sub-header of the first TB may indicate {CCCH+SDT} or SDT. For example, a specific codepoint of the LCID indicates {CCCH+SDT} or SDT. The SDT BSR MAC CE indicates the data size in the L2 buffer of the SDT logical channel.

In the case of the SDT RACH, the UE may transmit the UCI of the PUCCH resource, the UCI of the MSG3 PUSCH, or the UCI of the MSGA PUSCH according to the indication of the SDT configuration information, MSG2 DCI or RAR MAC CE from the BS. In the case of the SDT RACH, UCI bits may indicate an SDT scheduling request (SDT SR) by the UE. Through the SDT SR, the UE may indicate that there is UL data according to the SDT and request a UL grant for the SDT. In addition, the UCI bits of the SDT SR may be used to indicate the level of the SDT UL data size in an upper layer buffer. For example, they may indicate whether the SDT UL data size is above or below a specific level. Alternatively, each UCI bit of the SDT SR may be mapped to one or more SDT logical channels to indicate presence of UL data for each logical channel and to request a UL grant for the SDT.

5. After transmitting MSG3/A, the UE may receive HARQ retransmission resources or HARQ ACK or NACK of MSG3 or MSGA through the DCI transmitted in DCI format 0_0. In this case, the CRC of the DCI is scrambled with a temporary C-RNTI.

6. Also, after transmitting MSG3/A, the UE receives a contention resolution MAC CE or MSGB through the DCI transmitted in DCI format 1_0. The CRC of the DCI for scheduling the contention resolution MAC CE is scrambled with a temporary C-RNTI of MSG2, and the CRC of the DCI for scheduling the MSGB is scrambled with an MSGB-RNTI. Alternatively, the CRC of the DCI for scheduling the contention resolution MAC CE is scrambled with a C-RNTI used by the UE in the RRC_CONNECTED mode or scrambled with a C-RNTI received by the UE through the RRC Release message.

The DCI for DCI format 0_0 or DCI format 1_0 may additionally indicate SDT start. In this case, the UE determines that SDT UL transmission starts after the RACH. In the case where the DCI does not additionally indicate the SDT start, when contention resolution is successful, the RACH procedure is successfully terminated, the SDT BWP is deactivated, and SDT UL transmission is stopped. Thereafter, the operation is switched to the initial BWP to activate the initial BWP.

The DCI for DCI format 0_0 or DCI format 1_0 may additionally indicate an SDT BWP ID. For example, it indicates one of the SDT BWP IDs in the SDT configuration information. Upon receiving the DCI, the UE may activate the SDT BWP to perform SDT UL transmission.

The DCI for DCI format 0_0 or DCI format 1_0 may additionally allocate a PUCCH resource and send an SDT SR. In this case, the UE transmits the SDT SR on a PUCCH resource of the activated BWP (e.g., SDT BWP or initial BWP). The PUCCH resource may also be used to transmit HARQ ACK/NACK for MSG4/MSGB.

The DCI for DCI format 0_0 or DCI format 1_0 may additionally schedule SDT UL transmission. For example, the BS may indicate PUSCH resource information for SDT and an SDT HARQ Process ID through the DCI.

DCI format 0_1 may be used instead of DCI format 0_0, DCI format 1_1 may be used instead of DCI format 1_0, or a new DCI format for SDT may be used.

The BS may schedule SDT UL transmission through MSG4 or MSGB instead of the DCI. For example, a MAC PDU including a contention resolution MAC CE or a MAC PDU including a success RAR MAC CE may indicate PUSCH resource information for SDT and an SDT HARQ Process ID.

The PUSCH resource information for SDT may include the following fields:
  Frequency domain resource assignment
  PUSCH frequency hopping information
  Time domain resource assignment
  Modulation and coding scheme
  New data indicator
  Redundancy version
  TPC command for scheduled PUSCH
  UL/SUL indicator for scheduled PUSCH 7. Upon receiving the PUSCH resource information for SDT, the UE transmits SDT UL data according to the PUSCH resource. The UE transmits an SDT TB through the HARQ process mapped to the HARQ Process ID. Here, the SDT TB is composed of data of the SDT logical channel and zero or one or more MAC CEs.

8. After MSG4 or MSGB is received and contention resolution is performed, the UE performs PDCCH monitoring according to the SDT search space configuration received through the SDT configuration information when one or more of the following conditions are satisfied. The SDT search space (SDT SS) is of CSS Type 3, the USS type, or a new CSS type:
A. The MSG2 PDSCH, MSG4 PDSCH, or MSGB PDSCH includes an SDT-related field;
B. The MSG2 DCI, MSG4 DCI, MSGB DCI, or the DCI for assigning MSG3 retransmission resources includes an SDT-related field;
C. The RACH preamble or RACH resource transmitted by the UE indicates SDT UL transmission;
D. The UE transmits an SDT SR.

9. The UE may receive SDT DCI for allocating PUSCH resources for SDT through the SDT SS. The SDT DCI includes a HARQ Process ID for SDT, and indicates a HARQ Process ID that is the same as or different from the HARQ Process ID for SDT received in the previous RACH process. For example, when the HARQ Process ID indicated by the DCI of the SDT SS is different from the HARQ process ID received in the previous process (e.g., HARQ Process ID=2), the UE configures a new SDT TB, puts the same in the HARQ buffer, and transmits the PUSCH. On the other hand, when the HARQ Process ID indicated by the DCI of the SDT SS is the same as the HARQ process ID received in the previous process (e.g., HARQ Process ID=1), and the NDI is toggled, the UE discards the existing SDT TB in the HARQ buffer of the HARQ process, and configures a new SDT TB and puts the same in the HARQ buffer. The UE performs HARQ transmission of the new SDT TB in the HARQ buffer.

When the HARQ Process ID indicated by the DCI of the SDT SS is the same as the HARQ process ID received in the previous process (e.g., HARQ Process ID=1) and the NDI is not toggled, the existing SDT TB is retransmitted through the PUSCH resource allocated by the SDT DCI.

When the new SDT TB includes the last SDT data, the UE may cause the SDT TB to indicate the last TB. For example, the codepoint of the LCID field included in the SDT TB may indicate the last TB. Thereafter, when the DCI of the SDT SS indicates HARQ ACK, SDT release/deactivation, or SDT BWP deactivation, the UE determines that the SDT UL transmission is terminated. Thereafter, the SDT BWP is deactivated, the initial BWP is activated, and all valid SDT resources are released.

When receiving a HARQ retransmission resource through the DCI of the SDT SS, the UE retransmits the SDT TB in the HARQ buffer through the retransmission resource.

10. The BS may reconfigure the SDT configuration information for the next SDT RACH through the DCI of the SDT SS or through the PDSCH scheduled by the DCI of the SDT SS. For example, the DCI or PDSCH may allocate a UE dedicated preamble that may be used for the next SDT RACH. In this case, when new SDT UL data is generated after terminating the current SDT transmission, the UE may trigger a contention-free RACH using the UE dedicated preamble.

When the contention free RACH is triggered as described above, the UE transmits the UE dedicated preamble, monitors the PDCCH with the SDT SS, and receives the MSG2 DCI in which the CRC is scrambled with the C-RNTI through the SDT SS. The C-RNTI is the C-RNTI used by the UE in the connected mode or the C-RNTI received through an RRC Release message. The MSG2 DCI allocates an SDT PUSCH resource, and the UE transmits SDT UL data through the SDT PUSCH resource. In addition, the MSG2 DCI allocates an SDT PUCCH resource, and the UE may transmit an SDT SR through the SDT PUCCH resource.

11. In the above processes, the UE starts or restarts the SDT timer in the first symbol immediately after any of the following events occurs:
MSG2 indicating SDT is received;
The MSG4/MSGB PDSCH is received;
HARQ ACK for the MSG4/MSGB is transmitted;
PUCCH transmission is performed (for SDT SR);
☐ An SDT BWP is activated;
PUSCH HARQ transmission including UL data of an SDT logical channel is executed;
PUSCH HARQ transmission including the last SDT data is executed;
HARQ ACK or NACK is received for PUSCH HARQ transmission including the SDT logical channel data.

When the SDT timer expires, the UE determines that the SDT UL transmission is terminated. In this case, the UE may transmit a MAC CE or UCI indicating the termination of the SDT to the BS. Here, the MAC CE or UCI may indicate C-RNTI. Thereafter, the SDT BWP is deactivated, the initial BWP is activated, and all valid SDT resources are released.

Figure 13:
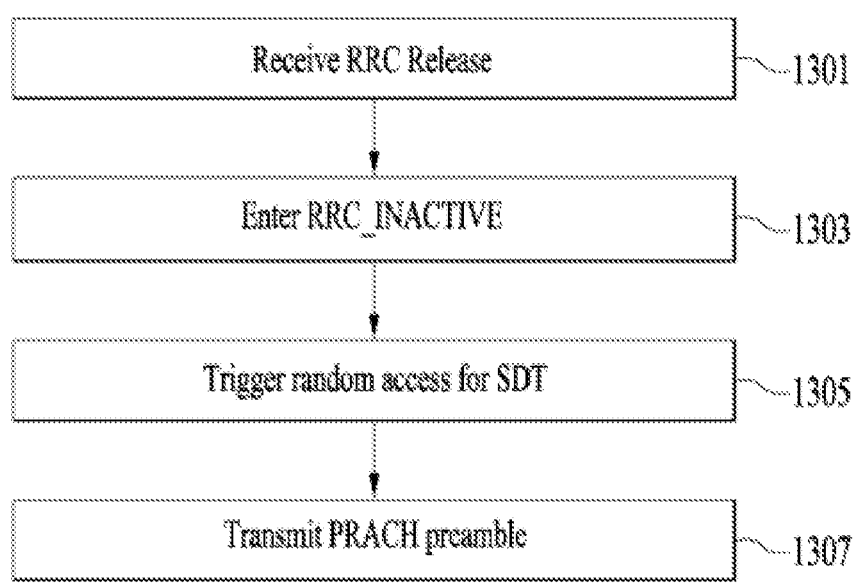
FIG. 13 illustrates a method of receiving a signal by a user equipment in an embodiment of the present disclosure.

FIG. 13 illustrates a method of receiving a signal by a UE in an embodiment of the present disclosure.

The UE receives an RRC release message including SDT configuration information (1301). The SDT configuration information includes CG resource configuration for SDT and RACH resource configuration for SDT.

The UE switches to the RRC inactive state based on the RRC release message (1303).

Based on predefined conditions being satisfied, the UE triggers a RACH for the SDT (1305). The predefined conditions include a condition that a quality of a serving cell or a quality of the best SSB of the serving cell is greater than or equal to a threshold indicated by the BS.

In the case of a 4-step RACH, the UE monitors DCI in which CRC is scrambled with an RA-RNTI after transmitting a RACH preamble based on a RACH resource configuration for the SDT (1307).

The UE receives a MSG2 PDSCH through the received DCI and transmits a first TB (MAC PDU) through a MSG3 PUSCH. In the case of a 2-step RACH, the UE transmits the first TB through the MAGA PUSCH.

The UE may receive a HARQ retransmission resource or HARQ ACK or NACK of MSG3 or MSGA through the DCI. The BS may schedule SDT UL transmission through MSG4 or MSGB instead of the DCI.

When the UE receives PUSCH resource information for the SDT, the UE transmits SDT UL data according to a PUSCH resource.

Effects According to the Present Disclosure

According to the present disclosure, selection among a RACH for SDT, a normal RACH, and a CG for SDT may be clarified.

Figure 14:
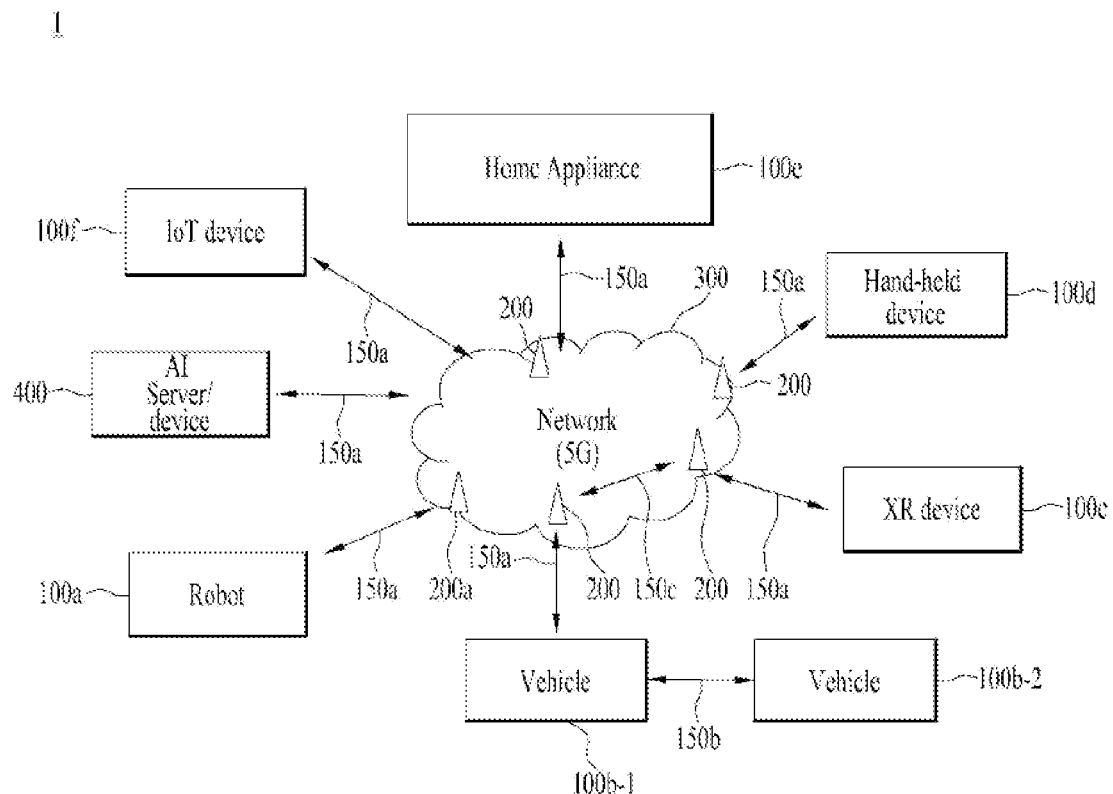
FIG. 14 to FIG. 17 illustrate a communication system 1 and wireless devices applied to the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
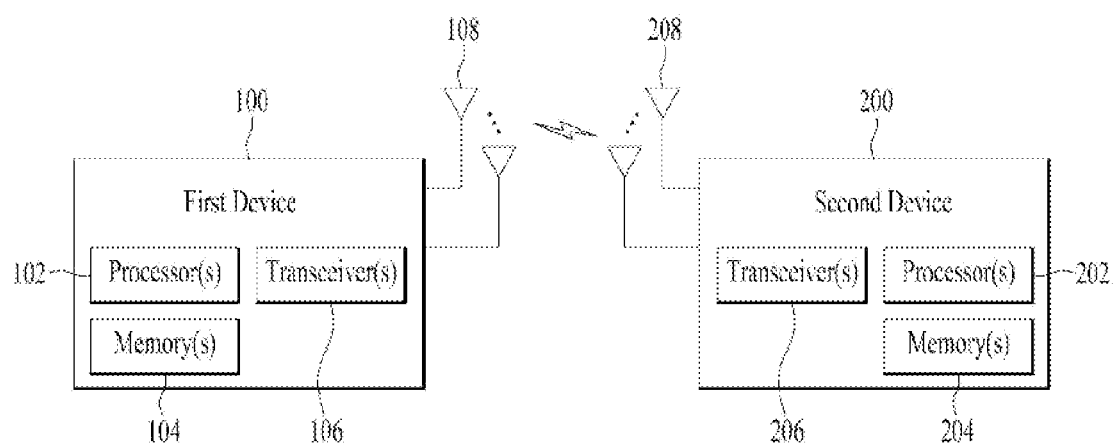

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
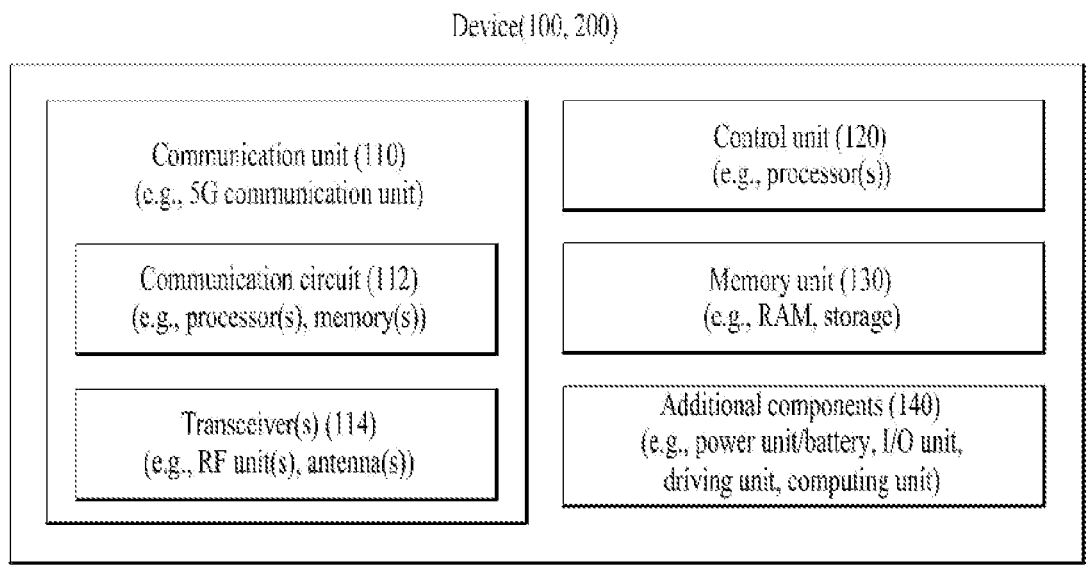

FIG. 16 illustrates another example of a wireless device applied to the present disclosure. The wireless device may be implemented in various forms according to a use-case/service (refer to FIG. 16).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
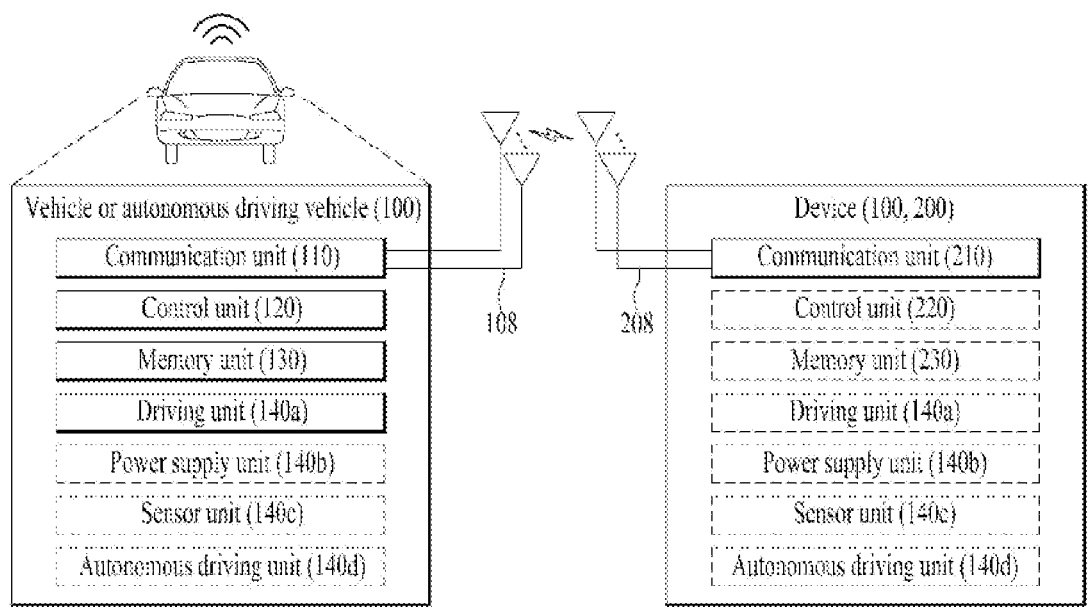

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
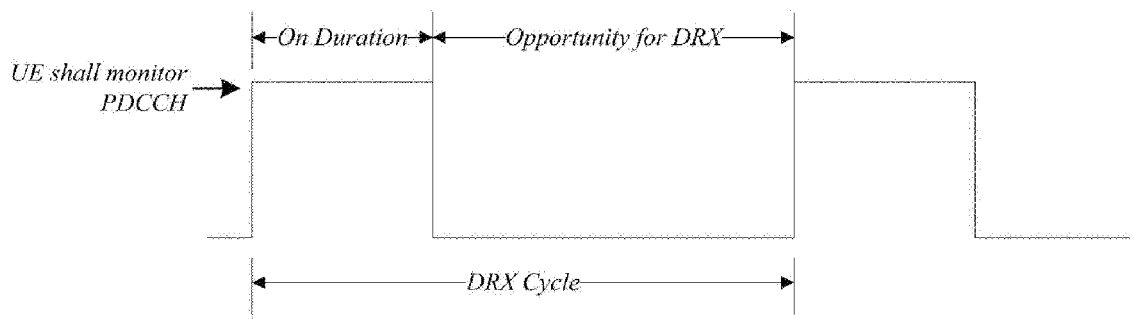
FIG. 18 illustrates an exemplary discontinuous reception (DRX) operation applied to the present disclosure.

FIG. 18 is a diagram illustrating a DRX operation of a UE according to an embodiment of the present disclosure.

The UE may perform a DRX operation in the aforedescribed/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 7

| Type of signals | UE procedure |
| --- | --- |
| 1$^{st}$ step  RRC signalling(MAC-CellGroupConfig) | Receive DRX configuration information |
| 2$^{nd}$ Step  MAC CE((Long) DRX command MAC CE) | Receive DRX command |
| 3$^{rd}$ Step  — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of performing a procedure of a small data transmission (SDT) by a user equipment (UE) in a wireless communication system, the method comprising:
    receiving configuration information related to the SDT; and
    performing the procedure of the SDT through a random access channel (RACH) procedure for the SDT based on a quality of a serving cell being above a threshold and based on a configured grant (CG) for the SDT not being configured,
    wherein the configuration information related to the SDT includes information for a search space for the SDT on which a physical downlink control channel (PDCCH) is monitored after a contention resolution related to the RACH procedure.

2. The method of claim 1, wherein the procedure of the SDT is performed based on random access resources selected for the SDT.

3. The method of claim 1, wherein the configuration information related to the SDT is received through a radio resource control (RRC) release message.

4. The method of claim 1, wherein the RACH procedure is performed based on a RACH resource configuration included in the configuration information related to the SDT.

5. The method of claim 4, further comprising:
    selecting a bandwidth part (BWP) for the SDT; and
    activating the BWP for the SDT and transmitting a RACH preamble on the activated BWP,
    wherein the RACH resource configuration includes a UE dedicated preamble or an SDT dedicated preamble, and
    wherein the RACH preamble is transmitted on a RACH occasion (RO) included in the RACH resource configuration for the SDT.

6. The method of claim 5, wherein, based on a result of measurement of a synchronization signal block (SSB) or channel state information reference signal (CSI-RS) mapped to the UE dedicated preamble being greater than or equal to a threshold, the RACH preamble is the UE dedicated preamble,
    wherein, based on the result of measurement of the SSB or CSI-RS mapped to the UE dedicated preamble being less than the threshold, and based on a result of measurement of an SSB or CSI-RS mapped to the SDT dedicated preamble being greater than or equal to the threshold, the RACH preamble is the SDT preamble, and
    wherein, based on the result of measurement of the SSB or CSI-RS mapped to the UE dedicated preamble being less than the threshold, and based on the result of measurement of the SSB or CSI-RS mapped to the SDT dedicated preamble being less than the threshold, the RACH preamble is a normal preamble.

7. The method of claim 6, wherein the quality of the serving cell is determined by a reference signal received power (RSRP) measured based on a synchronization signal block (SSB) or channel state information reference signal (CSI-RS) mapped to the RACH preamble.

8. A non-transitory computer-readable medium having recorded thereon a program code for executing the method of claim 1.

9. A user equipment (UE) of performing a procedure of a small data transmission (SDT) in a wireless communication system, the UE comprising:

a transceiver; and
one or more processors connected to the transceiver,
wherein the one or more processors are configured to:
receive configuration information related to the SDT; and
perform the procedure of the SDT through a random access channel (RACH) procedure for the SDT based on a quality of a serving cell being above a threshold and based on a configured grant (CG) for the SDT not being configured,
wherein the configuration information related to the SDT includes information for a search space for the SDT on which a physical downlink control channel (PDCCH) is monitored after a contention resolution related to the RACH procedure.

10. The UE of claim 9, wherein the configuration information related to the SDT is received through a radio resource control (RRC) release message.

\* \* \* \* \*